(12) United States Patent
Jiang et al.

(10) Patent No.: US 12,032,514 B2
(45) Date of Patent: Jul. 9, 2024

(54) METHOD, DEVICE, AND COMPUTER PROGRAM PRODUCT FOR ADAPTIVE MATCHING

(71) Applicant: Dell Products L.P., Round Rock, TX (US)

(72) Inventors: Ellie Changxu Jiang, Chengdu (CN); Helen Hailan Dong, Chengdu (CN); Allen Chen, Chengdu (CN); Shuang Zheng, Chengdu (CN)

(73) Assignee: DELL PRODUCTS L.P., Round Rock, TX (US)

( * ) Notice: Subject to any disclaimer, the term of this patent is extended or adjusted under 35 U.S.C. 154(b) by 29 days.

(21) Appl. No.: 17/865,209

(22) Filed: Jul. 14, 2022

(65) Prior Publication Data
US 2023/0342330 A1    Oct. 26, 2023

(30) Foreign Application Priority Data
Apr. 21, 2022    (CN) .......................... 202210423561.7

(51) Int. Cl.
*G06F 16/11* (2019.01)

(52) U.S. Cl.
CPC ................... *G06F 16/119* (2019.01)

(58) Field of Classification Search
CPC ................................................. G06F 16/119
See application file for complete search history.

(56) References Cited

U.S. PATENT DOCUMENTS

| | | | |
|---|---|---|---|
| 10,585,856 B1 * | 3/2020 | Bigman | G06F 3/0604 |
| 2008/0235300 A1 * | 9/2008 | Nemoto | G06F 16/119 |
| 2015/0213032 A1 * | 7/2015 | Powell | G06F 16/188 707/827 |

* cited by examiner

*Primary Examiner* — Hosain T Alam
*Assistant Examiner* — Anthony G Gemignani
(74) *Attorney, Agent, or Firm* — Amin, Turocy & Watson, LLP

(57) ABSTRACT

Adaptive matching is provided, which is used to automatically match a block size of a transactional file system with an IO size of a client. An example method includes creating a share domain, wherein the share domain is created on a first file system, and a block size of the first file system is a first block size. The method further includes determining a block size of the share domain as a second block size, wherein the second block size is not equal to the first block size. If a block size of a second file system is the second block size, the share domain is migrated from the first file system to the second file system. By implementing the present application, it is possible to simplify user operations, improve operational convenience, and help to reduce storage space fragments and indirect blocks, thereby further improving the performance of a storage system.

20 Claims, 8 Drawing Sheets

101 — Creating a share domain, wherein the share domain is created on a first file system, and a block size of the first file system is a first block size 102 — Determining a target block size of the share domain as a second block size, wherein the second block size is not equal to the first block size 103 — Migrating, if a block size of a second file system is the second block size, the share domain from the first file system to the second file system

METHOD, DEVICE, AND COMPUTER PROGRAM PRODUCT FOR ADAPTIVE MATCHING

RELATED APPLICATION

The present application claims the benefit of priority to Chinese Patent Application No. 202210423561.7, filed on Apr. 21, 2022, which application is hereby incorporated into the present application by reference herein in its entirety.

BACKGROUND

A transactional file system (TFS) gives administrators special permissions to select a block size (BS) of an underlying file system (FS) to best match a read and write/access (I/O (IO)) size of a host/client of a predetermined application (APP). Here, file system block size is the smallest physical mapping that can be guaranteed in the file system, and for conventional server message blocks (SMB) and network file systems (NFS), the file system block size is usually set to 8 KB. However, if a file system block size does not match different client IO sizes, a waste of storage space may be caused

SUMMARY

According to an example embodiment of the present disclosure, a solution of adaptive matching is provided for automatically matching a block size of a transactional file system with an IO size of a client.

In a first aspect of the present disclosure, an adaptive matching method is provided, the method including: creating a share domain, where the share domain is created on a first file system, and a block size of the first file system is a first block size; determining a block size of the share domain as a second block size, where the second block size is not equal to the first block size; and migrating, if a block size of a second file system is the second block size, the share domain from the first file system to the second file system.

The implementation of the first aspect can simplify the setting of file system configuration. Users don't need to consider whether block sizes of transactional file systems match IO block sizes of applications, and the system may automatically match IOs of clients to file systems with appropriate block sizes. Since users do not need to know the IO mode of a specific application when creating a transactional file system, by implementing the first aspect, it is possible to simplify user operations, improve operational convenience, and help to reduce storage space fragments and indirect blocks, thereby further improving the performance of a storage system.

In combination with the first aspect, in some embodiments, the first file system and the second file system are included in a file system group. One or more file systems in the file system group may be from one storage system or different storage systems in one cluster or even different clusters, and this distributed feature helps to achieve load balancing since one or more IOs may actually be distributed across different file systems.

In combination with the first aspect, in some embodiments, the method further includes: before migrating the share domain from the first file system to the second file system, determining that the second file system with a block size of the second block size exists in the file system group.

In combination with the first aspect, in some embodiments, the method further includes: before migrating the share domain from the first file system to the second file system, determining that no file system with a block size of the second block size exists in the file system group, and then creating a second file system in the file system group. The second file system is created to facilitate the later migration step.

In combination with the first aspect, in some embodiments, the determination of the block size of the share domain includes the following cases, and the determination of the block size of the share domain based on the access of clients helps to improve storage performance and fully utilize storage space.

In combination with the first aspect, in some embodiments, in response to the share domain being accessed by one or more clients, the block size of the share domain is determined as the second block size based on read/write (IO) block sizes of the one or more clients, where the second block size is an IO block size whose proportion is greater than a first threshold in the share domain.

In combination with the first aspect, in some embodiments, in response to the share domain being accessed by one or more clients, the block size of the share domain is determined as the second block size based on read/write (IO) block sizes of the one or more clients, the second block size being a default block size, where proportions of the IO block sizes of the one or more clients in the share domain are all less than a first threshold.

In combination with the first aspect, in some embodiments, in response to the share domain not being accessed by any client, the block size of the share domain is determined as the second block size, the second block size being a default block size.

In combination with the first aspect, in some embodiments, in the case where the share domain is created on the first file system, there is a first redirect link between the share domain and the first file system.

In combination with the first aspect, in some embodiments, the method further includes: deleting the first redirect link after migrating the share domain from the first file system to the second file system.

In combination with the first aspect, in some embodiments, the method further includes: generating a second redirect link between the share domain and the second file system after migrating the share domain from the first file system to the second file system.

In a second aspect of the present disclosure, a device is provided, including a processor and a memory that is coupled to the processor and has instructions stored therein, wherein the instructions, when executed by the processor, cause the device to execute actions including: creating a share domain, wherein the share domain is created on a first file system, and a block size of the first file system is a first block size; determining a block size of the share domain as a second block size, where the second block size is not equal to the first block size; and migrating, if a block size of a second file system is the second block size, the share domain from the first file system to the second file system.

The implementation of the second aspect can simplify the setting of file system configuration. Users don't need to consider whether block sizes of transactional file systems match IO block sizes of applications, and the system may automatically match IOs of clients to file systems with appropriate block sizes. Since users do not need to know the IO mode of a specific application when creating a transactional file system, by implementing the first aspect, it is possible to simplify user operations, improve operational convenience, and help to reduce storage space fragments and indirect blocks, thereby further improving the performance of a storage system.

In combination with the second aspect, in some embodiments, the first file system and the second file system are included in a file system group. One or more file systems in the file system group may be from one storage system or different storage systems in one cluster or even different clusters, and this distributed feature helps to achieve load balancing since one or more IOs may actually be distributed across different file systems.

In combination with the second aspect, in some embodiments, the actions further include: before migrating the share domain from the first file system to the second file system, determining that the second file system with a block size of the second block size exists in the file system group.

In combination with second aspect, in some embodiments, before migrating the share domain from the first file system to the second file system, it is determined that no file system with a block size of the second block size exists in the file system group, and then a second file system is created in the file system group. The second file system is created to facilitate migration.

In combination with the second aspect, in some embodiments, in response to the share domain being accessed by one or more clients, the block size of the share domain is determined as the second block size based on read/write (IO) block sizes of the one or more clients, where the second block size is an IO block size whose proportion is greater than a first threshold in the share domain.

In combination with the second aspect, in some embodiments, the determination of the block size of the share domain includes the following cases, and the determination of the block size of the share domain based on the access of clients helps to improve storage performance and fully utilize storage space.

In combination with the second aspect, in some embodiments, in response to the share domain being accessed by one or more clients, the block size of the share domain is determined as the second block size based on read/write (IO) block sizes of the one or more clients, the second block size being a default block size, where proportions of the IO block sizes of the one or more clients in the share domain are all less than a first threshold.

In combination with the second aspect, in some embodiments, in response to the share domain not being accessed by any client, the block size of the share domain is determined as the second block size, the second block size being a default block size.

In combination with the second aspect, in some embodiments, in the case where the share domain is created on the first file system, there is a first redirect link between the share domain and the first file system.

In combination with the second aspect, in some embodiments, the actions further include: deleting the first redirect link after migrating the share domain from the first file system to the second file system.

In combination with the second aspect, in some embodiments, the actions further include: generating a second redirect link between the share domain and the second file system after migrating the share domain from the first file system to the second file system.

In a third aspect of the present disclosure, a computer program product is provided. The computer program product is tangibly stored on a computer-readable medium and includes machine-executable instructions. The machine-executable instructions, when executed, cause a machine to execute the method according to the first aspect of the present disclosure.

In a fourth aspect of the present disclosure, a computer-readable storage medium is provided having a computer program stored thereon, wherein the computer program causes, when executed by a device, the device to perform the method according to the first aspect of the present disclosure.

As can be seen from the above description, with the solution according to the embodiments of the present disclosure, it is possible to automatically match, for a file storage system, block sizes of transactional file systems with IO sizes of clients, so as to simplify user operations, improve operational convenience, and help to reduce storage space fragments and indirect blocks, thereby further improving the performance of the storage system It should be understood that this Summary is provided to introduce some concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar drawing marks represent identical or similar elements, in which.

DETAILED DESCRIPTION

Figure 1:
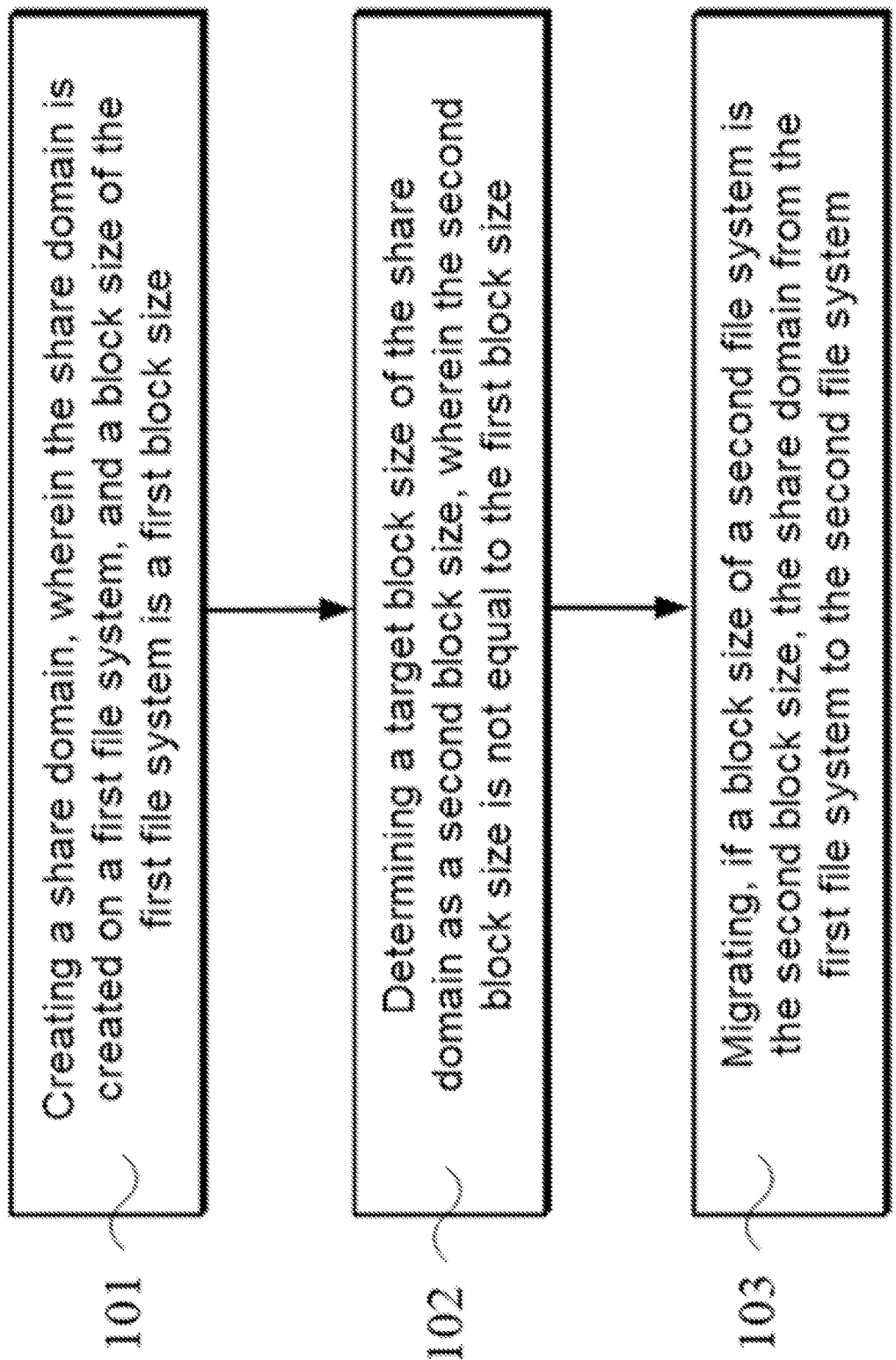
FIG. 1 illustrates a flow chart of an adaptive matching method that can be used to implement some embodiments according to the present disclosure.

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Since transactional file systems are typically used to support the workload of specific applications, some products provide the function of setting the file system block size to 8 KB, 16 KB, 32 KB, or 64 KB during file system configuration, so as to best adapt to client IO sizes typically used by the specific applications.

In some embodiments, it is not always possible for an administrator or user to know the client IO sizes of different applications when establishing an FS or configuring an FS. If the administrator or user sets a fixed file system block size, it may result in FS block size not matching the client IO sizes of some applications, which may increase fragments and/or indirect blocks or indexes, resulting in unnecessary waste of storage space resources and metadata. If the administrator manually finds the client IO size of each application and sets the file system block size manually according to the client IO sizes of different applications, there will be obvious defects such as cumbersome operations and inefficiency.

It is a problem urgently to be solved to automatically set the file system (FS) block size according to client IO sizes of different applications. Matching appropriate file system block sizes for different client IO sizes helps to reduce space fragments and/or indirect blocks and improve the utilization of a storage space.

When establishing or configuring an FS, it is not always possible for a user to know the client IO size of each application. For common applications, a mapping table of the correspondence between these applications and their client IO sizes may be stored, thus replacing the manual setting of the client IO sizes of these applications by the user. Then, the system will set the file system block sizes based on this mapping table to match the client IO sizes of these applications.

The method of setting a mapping table still has room for improvement, such as the following.

Firstly, usually, only one block size can be set when creating a file system. Then, when a user wants to run multiple applications, he or she creates multiple file systems with different block sizes, thus allowing applications with different client I/O sizes to correspond to file systems with appropriate block sizes. Alternatively, only one file system is created for use by multiple applications, but this may cause the file system block size to not match client I/O sizes of some applications.

Secondly, there are only a limited number of predetermined applications that can be selected, and if an application is not recorded in the mapping table, the most appropriate block size to match the application still cannot be determined.

Thirdly, when creating a file system, the user should know the specific application that will run on that file system, but often the user does not want to manually select which application corresponds to which file system, and the application used or running may change as the user's need changes. This method will make the user worry about which application should run on which file system.

To this end, the present application proposes an adaptive matching method based on an analytic cognitive algorithm and used for automatically matching block sizes of transactional file systems with client I/O sizes of applications, which solves the above problem that block sizes of transactional file systems cannot automatically match client I/O sizes of applications. This method makes a storage system more intelligent compared with techniques that require users to manually match block sizes of transactional file systems with client I/O sizes of applications. Such intelligent storage system provides a feature that can adaptively match client I/O sizes of applications with block sizes of file systems, so that users no longer need to worry about the management of which application should run on which file system.

In one or more example embodiments, the present application proposes an adaptive matching method for automatically creating a distributed transactional thin-provision file system (DTTFS) block size to match client IO sizes of different APPs.

The "DTTFS" proposed in the present application is a distributed file system defined at the software level, which can ensure, in most cases, that a client IO block size matches a block size of the transactional file system by using a client IO analysis agent (i.e., host IO analysis agent). The DTTFS may provide functions including: adaptive grouping of file systems and adaptive matching and migration, adaptive routing of client IOs to FSs with appropriate block sizes, distributed storage load balancing, etc.

In embodiments of the present disclosure, a distributed file system (DFS) is a complete hierarchical file system, in which the physical storage resources managed by the file system are not necessarily directly connected to local nodes but are connected to nodes through a computer network, or several different logical disk partitions or volume labels are combined together. DFS provides a logical tree file system structure for resources distributed anywhere on the network, thus making it easier for users to access shared files distributed on the network. DFS may extend a file system fixed at a certain location to any number of locations/file systems, with numerous nodes forming a file system network. The nodes may be distributed at different locations, and communication and data transmission between nodes may be performed through the network. When using a distributed file system, people do not need to care about which node the data is stored on or acquired from, and instead manage and store the data of the file system as if it were a local file system. DFS distributes a large amount of data to different nodes, greatly reducing the risk of data loss. DFS is redundant, the failure of some nodes do not affect the normal operation of the whole, and even if the data stored in a failed computer has been corrupted, the corrupted data can be recovered by other nodes. Therefore, security is the most important feature of a distributed file system.

Here, thin provision technology is an on-demand storage technology that provides storage space to applications on demand from a common storage pool, which substantially eliminates the waste of allocated but unused space. The main advantage that the thin provision technology can provide is that it improves the overall utilization of storage space. It automates storage allocation, thereby significantly reducing the work of storage administrators, it may reduce the amount of storage required to serve APPs, and it may also reduce the number of disks required, thus leading to a significant reduction in energy consumption.

Here, transactional storage technology is a concurrency control mechanism in which applications accessing the same storage are classified into several transactions and run independently, and eventually all these transactions are all submitted or all failed to avoid conflicts.

In the present application, a new concept of share domain, also referred to as mount domain, is proposed, which serves as the unit corresponding to client IO access, instead of the entire file system. The analysis of IOs based on each share domain and the data migration and configuration based on each share domain can make this method more flexible and lightweight to implement.

The term "mount" in the embodiments of the present application is a mechanism to distinguish different logical paths in the file system. In a computer system, files are stored in different paths, and the operating system may make files and directories on the computer storage device be accessible to users through the file system of the computer. The purpose of mounting is to determine corresponding storage paths of objects such as files and directories, and to establish an association relationship between objects, such as files and directories, and the file system, so that the file system serves as an access portal for objects such as files and directories. As an example, a share domain mounted to a client may refer to that an association relationship between the client and the share domain has been established and the client may read and write through the paths of the share domain.

The client IO analysis agent proposed in the present application, as a service, may be used to determine an optimal block size, also referred to as a target block size, of a particular share domain, i.e., the optimal block size when the share domain matches the vast majority of client IOs. Furthermore, its analysis result may also indicate how to allocate the share domain for F, where F may refer to a group of file systems that may serve individual clients as a group.

A method embodiment of an adaptive matching method provided by the present application is described below. The subject of implementation of the method may be device 1100 that implements embodiments of the present disclosure. Referring to FIG. 1:

At block 101: a share domain is created, where the share domain is created on a first file system, and a block size of the first file system is a first block size.

In this embodiment, the share domain may also be referred to as a mount domain, and is located on the file system as a unit accessed by one or more clients. The share domain can be accessed by zero or one or more clients, or alternatively, the share domain may be mounted to one or more clients.

Here, the first file system is a file system in a file system group, and the file system group is the aforementioned F, which may refer to a group of file systems including one or more file systems that may serve individual clients as a group. For example, in the later example scenario I, the file system group is equivalent to serving file system 701, the first file system may be FS1 (702), and the second file system may be FS2 (703).

In an example, the share domain may be share domain 3 (706) in the later example scenario I, the first file system may be file system FS1 (702) in the later example scenario I, and the first block size may be the block size, 8 KB, of file system FS1 (702) in the later example scenario I.

In some embodiments, when creating a file system in a file system group, the block size of that file system may be specified. If the block size of that file system is not specified, its block size will be created by default as the default block size, such as 8 KB.

When the share domain is created on the first file system, there is a first redirect link corresponding to the logical relationship between the share domain and the first file system, for example, the redirect link between share domain 3 (706) and FS1 (702) in the later example scenario I.

At block 102: a target block size of the share domain is determined as a second block size, wherein the second block size is not equal to the first block size.

The action of determining the target block size of the share domain may be performed by a first analysis agent service. The first analysis agent service may be the client IO analysis agent described later, which may be used as a service to determine the target block size, or referred to as optimal block size, of each share domain, i.e., the optimal block size when the share domain matches the vast majority of client IOs. The client IO analysis agent will continuously monitor the IO block sizes of one or more clients that access each share domain. Furthermore, the analysis result of the client IO analysis agent for the target block size of each share domain may also indicate how the share domain should be allocated in F. For the logic of the operation of the client IO analysis agent, reference may be made to the subsequent embodiments, which will not be described here for now.

The share domain is used to support client access, and the second block size is determined based on the client access. In an example, the second block size may be the IO target block size, 32 KB, of share domain 3 (706) in the later example scenario I.

Here, the determination of the target block size includes the following several scenarios.

In some embodiments, the share domain is accessed by one or more clients, the target block size may be determined based on read and write/access (IO) block sizes of the one or more clients, and if the proportion of a particular IO block size in the share domain is greater than a first threshold, that IO block size is determined to be the target block size. In an example, the first threshold may be 90%. For example, in the later example scenario I, the predominant block size on share domain 2 (705) is 8 KB, so the IO target block size of share domain 2 (705) is determined to be 8 KB.

In some embodiments, the share domain is accessed by one or more clients, the target block size may be determined based on read and write/access (IO) block sizes of the one or more clients, and if the proportions of the IO block sizes in the share domain are all less than the first threshold, the target block size is determined to be the default block size. In an example, the default block size is 8 KB. For example, in the later example scenario I, share domain 1 (704) is shared by multiple applications with different block sizes, and the proportions of their block sizes of 32 KB and 64 KB do not meet the standard for being a target block (e.g., the proportion needs to be greater than 90%), so it is not suitable for migration. Therefore, the IO target block size of share domain 1 (704) is determined as the default block size of 8 KB.

In some embodiments, if there are no client access on the share domain, it is confirmed that the target block size of the shared domain is the default block size. For example, in the later example scenario I, there is no APP running on share domain 4 (707), so the IO target block size of share domain 4 (707) is determined to be the default block size of 8 KB.

At block 103: if a block size of a second file system is the second block size, the share domain is migrated from the first file system to the second file system.

Here, the second file system is a file system in a file system group. In an example, the second file system may be file system FS2 (703) in the later example scenario I.

In some embodiments, before migrating the share domain from the first file system to the second file system, if it is confirmed that a second file system with a block size of the second block size already exists in the file system group, the migration may be initiated. For example, in the later example scenario I, share domain 5 (708) with a target block size of 32 KB is migrated from FS1 (702) with a block size of 8 KB to FS2 (703) with a block size of 32 KB that has been established.

In some embodiments, before migrating the share domain from the first file system to the second file system, if it is detected that no file system with a block size of the second block size exists in the file system group, a second file system with a block size of the second block size can be created in the file system group first, and then the migration step is performed. For example, in the later example scenario I, it is detected that no file system with a block size of 32 KB exists in serving file system 701 group, then file system FS2 (703) with a block size of 32 KB is created first, and then share domain 3 (706) with a target block size of 32 KB is migrated from FS1 (702) with a block size of 8 KB to FS2 (703) with a block size of 32 KB.

While migrating the share domain from the first file system to the second file system, the aforementioned first redirect link is deleted, and a second redirect link corresponding to the logical relationship between the share domain and the second file system is generated. For example, in the later example scenario I, when migrating share domain 3 (706) from file system FS1 (702) to file system FS2 (703), the redirect link between share domain 3 (706) and FS1 (702) is deleted, and a redirect link between share domain 3 (706) and FS2 (703) is generated.

For the description of specific implementation of the creation check logic of related file system, the serving mechanism of the client IO analysis agent, the migration check logic of shared domain, and the like, reference may be made to the description in later embodiments, which will not be repeated here for now.

In another possible implementation, before a share domain is created, a second file system with a block size of the second block size has already been created, and then the share domain may be created directly on the second file system by a user. In this case, the user performs matching manually and does not need to perform the process of automatic system migration. For example, in combination with example scenario I, when the user creates new share domain 5 (708), the system may provide one or more available options for the IO block sizes of clients. If the user selects a block size of 32 KB when creating share domain 5 (708), while FS2 (703) with a block size of 32 KB already exists, share domain 5 (708) may be then created directly on FS2 (703). In this case, there is no need to migrate the share domain since the block size of 32 KB matches the output result of the client IO analysis.

Further example embodiments proposed in the present application will be described below in combination with the accompanying drawings.

Regarding the Creation of DTTFS.

The creation of DTTFS is similar to the creation of a commonly used transactional file system, but two rules are noted: one rule is that what is created is a thin-provision transactional file system, and the other rule is that a user does not need to choose which IO block size will run on this file system, the default value of block size for initializing E is 8 KB, and if the user sets a new value when creating a file system, that new value will replace the default value.

Regarding the Structure of DTTFS.

Figure 2:
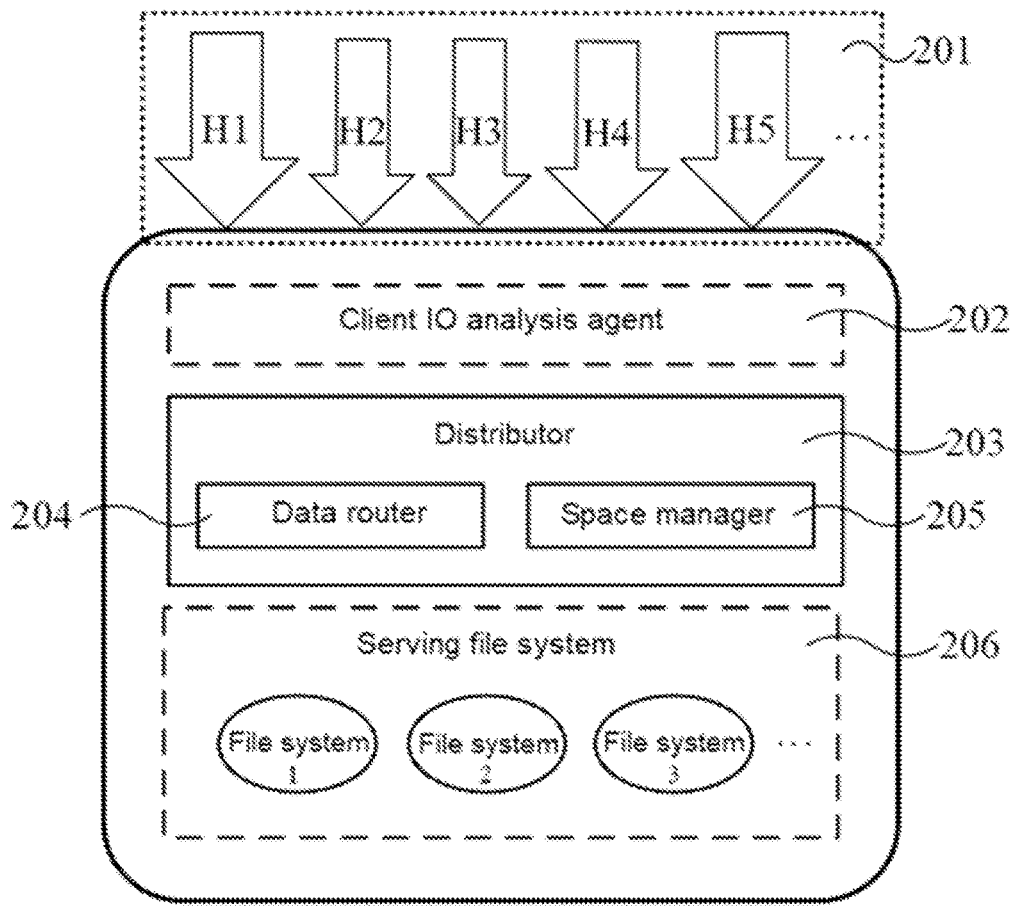
FIG. 2 illustrates a schematic diagram of the structure of a file system that can be used to implement some embodiments according to the present disclosure.

Referring to FIG. 2, the structure of DTTFS is illustrated.

Client 1 (H1), client 2 (H2), client 3 (H3), client 4 (H4), client 5 (H5), etc., illustrated in block 201 indicate a plurality of different client IOs.

Client IO analysis agent 202 is a service that may be used to determine the optimal block size of each share domain based on the client IO size of each accessing client, and its analysis result may also indicate how the share domain is allocated for F.

Distributor 203 is used to match share domains with file systems. DTTFS includes one or more share domains and one or more file systems. Depending on the block size, different share domains may be created on different file systems. The distributor may be used to migrate a share domain to an appropriate file system, and also used to allocate and manage storage space.

Distributor 203 includes, for example, functional module data router 204 and functional module space manager 205.

Data router 204 is used to provide cross-connection path entries for different share domains, so as to associate different share domains with appropriate file systems with corresponding block sizes.

Space manager 205 is used to provide space search and/or space management functions when F works as a group, and the available space is the sum of individual file systems in the F group.

Serving file system (serving FS) 206 refers to a group of file systems F that provide storage services and may function as a group serving one or more clients. It may contain a plurality of file systems, such as file system 1 (FS1), file system 2 (FS2), and file system 3 (FS3). Different file systems may have different block sizes and may be used to create one or more share domains to provide storage space with appropriate block sizes for applications with different client IO sizes.

The Symbols Used in the Algorithm for Creation of DTTFS are as Follows.

F: a group of file systems that can be used as a group that serves clients, where F may contain one or more elements f, and each f refers to a general transactional thin-provision file system.

B: existing supportable block sizes in F, which is a set of block sizes used by existing one or more file systems f. When a new file system f is added to F, a block size will be added at the same time.

Share domain: referred to as share domain or mount domain, where a part of a file system may be specified as a share domain, and the share domain may be accessed by one or more clients.

E: an analysis result of a client IO analysis agent, which is a list for recording IO target block sizes (in unit of "KB") of one or more clients on the share domain, where e[n] is the target block size of share domain n, which represents the block size of most IOs in share domain n, and E is initialized to the default block size. For example, E=[8] when the default block size is 8 KB.

M: M refers to merged elements in E, that is, duplicate values are filtered out and unique values are screened out. If E=[8, 8, 16, 8, 16], then M=merge(E)=[8,16].

The Creation of the File System in DTTFS May be Divided into Two Phases.

Figure 3A:
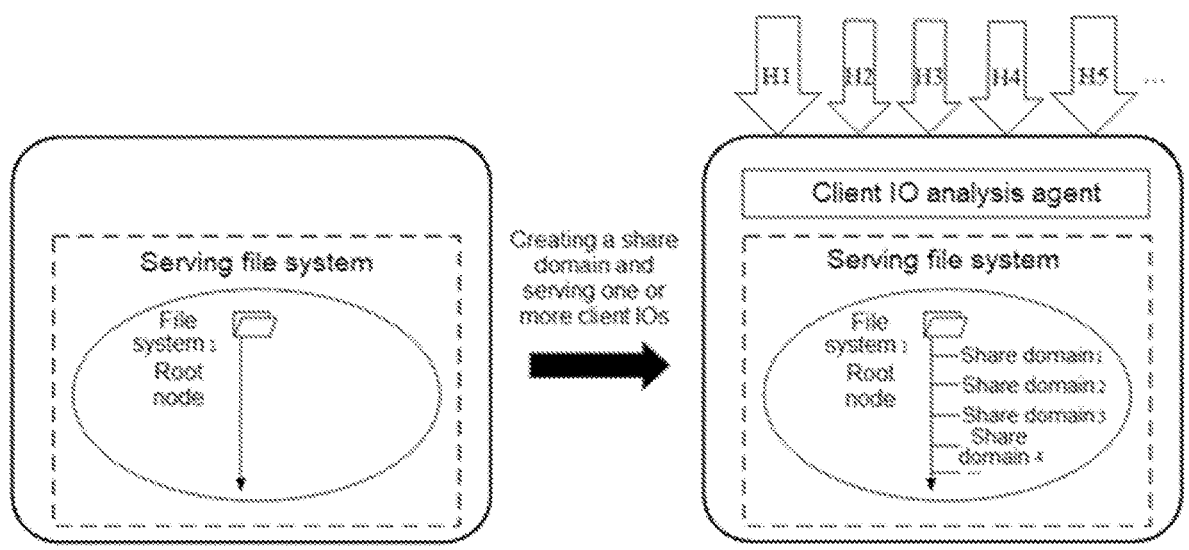
FIG. 3A illustrates a schematic diagram of the creation of a file system that can be used to implement some embodiments according to the present disclosure.

First Phase:

Referring to FIG. 3A, when there is only one default value in M, a general transactional thin-provision file system FS1 is created for serving one or more client IOs. It should be noted that when the initial creation of the first phase is performed, the work of the client IO analysis agent will not be triggered until any share domain is created. As shown in FIG. 3A, when one or more share domains are created to serve one or more client IOs, the client IO analysis agent will continuously monitor the IO block sizes of clients that access the share domains.

Second Phase:

When the client IO analysis agent has a new analysis output, the creation work flow is triggered to check whether a new file system should be created.

Figure 3B:
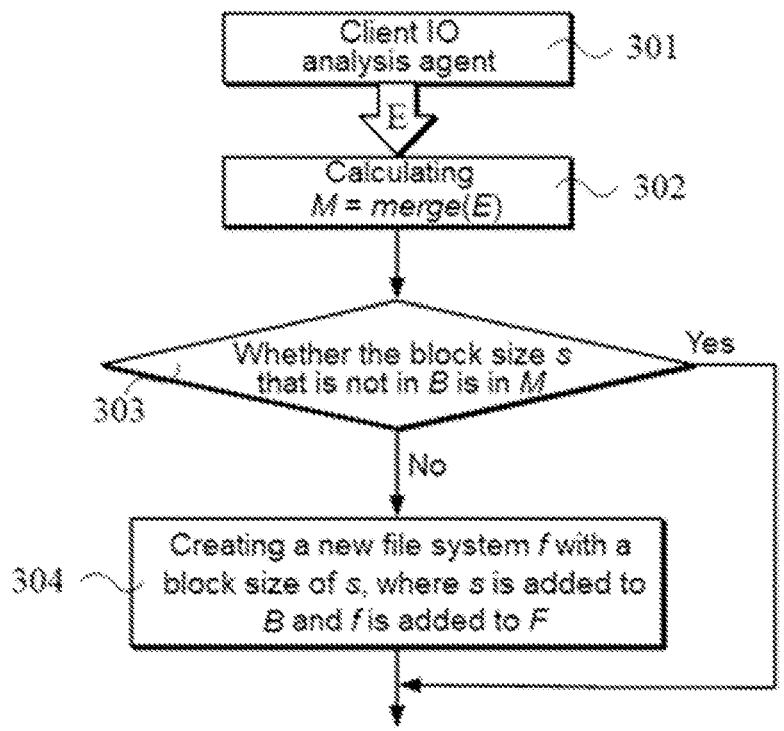
FIG. 3B illustrates a flow chart of a creation checking logic that can be used to implement some embodiments according to the present disclosure.
Figure 4:
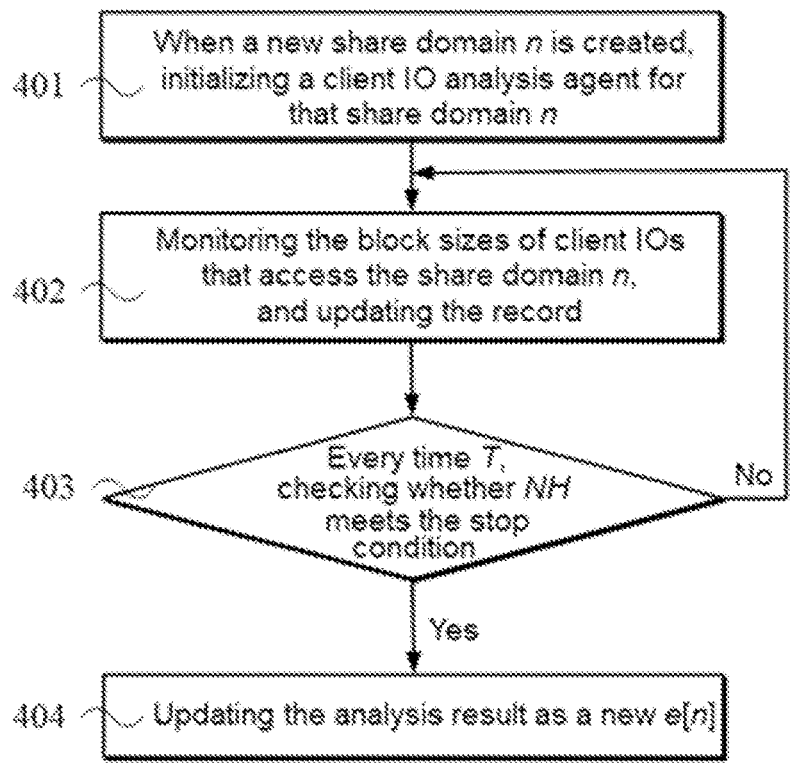
FIG. 4 illustrates a flow chart of a client IO analysis agent algorithm that can be used to implement some embodiments according to the present disclosure.

Referring to FIG. 3B, FIG. 3B illustrates a flow chart of a creation checking logic for the FS in the second phase.

At block 301: the client IO analysis agent monitors the IO target block sizes of one or more share domains and then outputs analysis result E.

At block 302, M=merge(E) is calculated. M refers to merged elements in E, that is, duplicate values are filtered out and unique values are screened out. For example, if E=[8, 8, 16, 8, 16], then M=merge(E)=[8,16].

At block 303: it is determined whether the target block size s of the new share domain that is not in B is in M. If not, that is, if there is no value of s in M, block 304 is executed, and if yes, that is, if there is a value of s in M, the process is skipped and the subsequent process is executed.

At block 304: a new file system f with a block size of s is created, where s is added to B and f is added to F.

The Service Mechanism of the Client IO Analysis Agent is Described Below.

The client IO analysis agent is a backend service. The creation of any share domain will trigger the work of the client IO analysis agent, and then the client IO analysis agent may continuously monitor the IO block sizes of the clients that access the share domains until a stop condition is met.

The following algorithm describes how the client IO analysis agent works.

The Symbols in the Algorithm of the Client IO Analysis Agent are as Follows.

E: a list recording IO target block sizes in units of "KB," where e[n] is the IO target block size of the share domain n, which represents the block size of most IOs on the share domain n.

E: candidate block sizes in units of "KB" supported by the transactional file system.

E: the number of candidate block sizes and the length of C.

E: it is used to record the number of the accessing client IOs with different block sizes, where nh[i] tracks the number of (one or more) IOs with a block size of c[i].

$total_{ios}$: when the client IO analysis agent operates to track the IO states of the share domain n, it records the number of writing IOs that access the share domain n in total.

selector_threshold: the threshold for the number of IOs that trigger the client IO analysis agent to output analysis results.

E: a time interval that is a time period for checking whether the client IO analysis agent meets the stop condition.

E: the watermark of the stop condition. Generally, it may be 90%.

The main steps of the algorithm of the client IO analysis agent are as follows.

At block 401: when a new share domain n is created, a client IO analysis agent for that share domain n is initialized.

For example, the IO target block size of the share domain n is initialized: e[n]=8, and the candidate block size: C=[8, 16,32,64], nh[i]=0, where i∈{0, 1, . . . , M}, and $total_{ios}$=0.

At block 402: the block sizes of (one or more) client IOs that access the share domain n are monitored, and the record is updated.

For an accessing writing IO, $total_{ios}$ is updated, and nh[i] is increased if the block size of the accessing IO is c[i] KB.

At block 403: every time T, it is checked whether NH meets the stop condition, and if yes, block 404 is executed; otherwise, block 402 is executed.

At block 404: the analysis result is updated as a new e[n]. Part of the virtual code is shown as follows:

```
if max(NH)max(NH) is larger than __hhselector_threshold:
    if max(NH) > total_ios * WM:
        //update e[n] as the analysis result
        output [ ]=[arg max(NH)]e[n] = C[argmax(NH)]
    else: //keep e[n] at the original value
        output e[n]
else:
    go to 402 //go to block 402
```

Generally, if the second phase of creation is not triggered, there is only one transactional thin-provision file system in F, and then the DTTFS works just like a common transactional thin-provision file system with nothing special. This case is called F working in a "single mode."

If the second phase of creation is triggered, the mode of F will change to a "group mode" because it has a plurality of file systems. According to E, a share domain with the corresponding block size will be migrated to the newly added file system. The distributor is triggered to provide data router and space manager functions. The user will not notice these changes. After the new share domain is created on first file system FS1, it is continuously monitored by the client IO analysis agent to determine whether migration is required.

Figure 5:
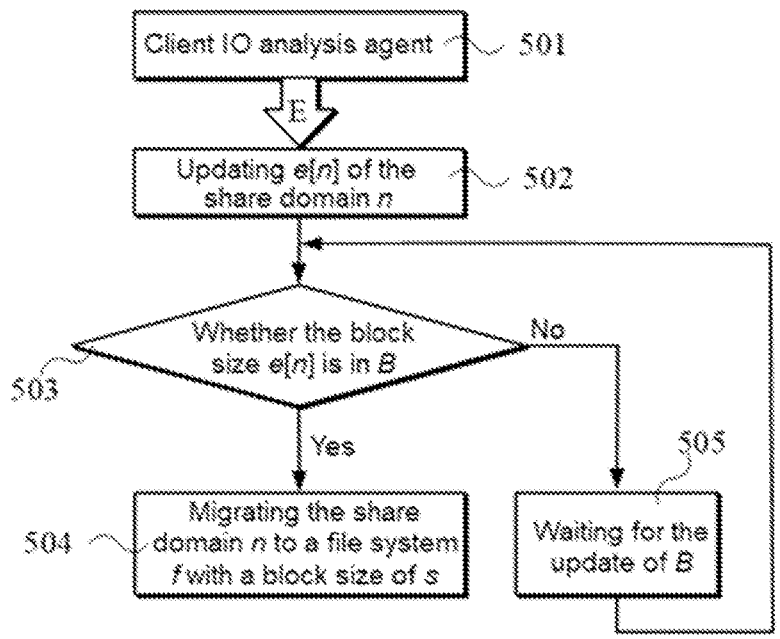
FIG. 5 illustrates a flow chart of a migration checking logic that can be used to implement some embodiments according to the present disclosure.

The migration checking logic is described below with reference to FIG. 5.

At block 501: the client IO analysis agent monitors the IO target block sizes of one or more share domains and then outputs an analysis result E.

At block 502: the e[n] of share domain n is updated.

At block 503, it is determined whether block size e[n] is in B, if not, block 505 is executed, and if yes, block 504 is executed.

At block 504: the share domain n is migrated to a file system f with a block size of s, after which the subsequent process is executed.

At block 505: the update of B is awaited, after which the process returns to execute block 503.

Figure 6:
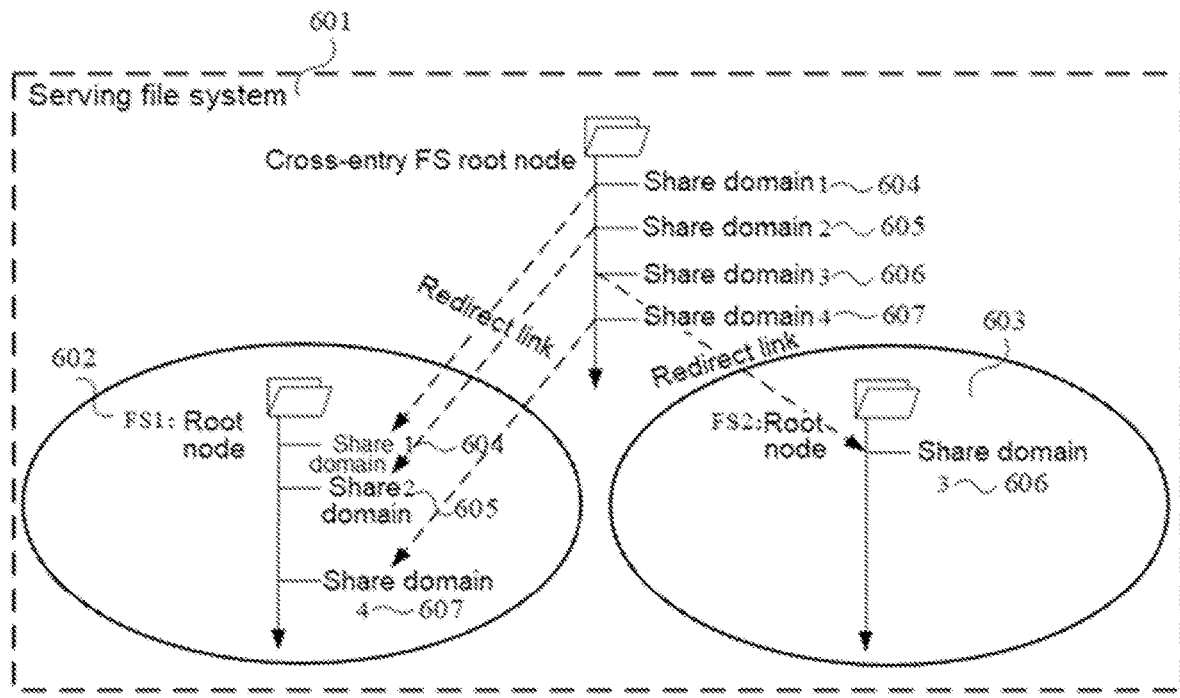
FIG. 6 illustrates a schematic diagram related to an example scenario of adaptive matching that can be used to implement some embodiments according to the present disclosure.

The creation of the file system and the migration of the share domain are illustrated in connection with the example of FIG. 6. As shown in FIG. 6, share domain 1 (604), share domain 2 (605), share domain 3 (606), and share domain 4 (607) are created in serving file system 601 group. Assuming that the target block size of share domain 1 (604), share domain 2 (605), and share domain 4 (607) is 8 KB, and the target block size of share domain 3 (606) is 32 KB. One possible implementation is as follows: when the user creates share domain 1 (604), share domain 2 (605), share domain 3 (606), and share domain 4 (607), share domain 1 (604), share domain 2 (605), share domain 3 (606), and share domain 4 (607) are created (by default) to FS1 (602) with a block size of 8 KB, and then based on the creation checking logic and migration checking logic in the aforementioned embodiments, it is detected that the target block size of share domain 3 (606) is 32 KB; then, FS2 (603) with an appropriate block size of 32 KB is created, and share domain 3 (606) is migrated to FS2 (603). Another possible implementation is as follows: before creating share domain 1 (604), share domain 2 (605), share domain 3 (606), and share domain 4 (607), FS1 (602) with a block size of 8 KB and FS2 (606) with a block size of 32 KB have already been created, and when creating share domain 1 (604), share domain 2 (605), share domain 3 (606), and share domain 4 (607), the user creates share domain 1 (604), share domain 2 (605), and share domain 4 (607) directly to FS1 (602) with a block size of 8 KB, and creates share domain 3 (606) directly to FS2 (603) with a block size of 32 KB, so that the user does the matching manually and does not need to perform the migration process.

An Example Scenario I is Provided Below to Better Help to Understand the Technical Solution of the Present Application.

The work flow of example scenario 1 includes the following description.

Transactional thin-provision serving file system 701 with a capacity of 1 TB is created.

Four share domains for serving one or more client IOs are created, i.e., share domain 1 (704), share domain 2 (705), share domain 3 (706), and share domain 4 (707), where:

client 1 (H1) (711) runs applications (of which the block sizes are mainly 64 KB) on share domain 1 (704);
client 2 (H2) (712) runs applications (of which the block sizes are mainly 8 KB) on share domain 2 (705);
client 3 (H3) (713) runs applications (of which the block sizes are mainly 8 KB) on share domain 2 (705);
client 4 (H4) (714) runs applications (of which the block sizes are mainly 32 KB) on share domain 3 (706); and
client 5 (H5) (715) runs applications (of which the block sizes are 32 KB and 64 KB, and the ratio of the two is 1:1) on share domain 1 (704).

Share domain 4 (707) is created, but no applications are running on it.

That is, in this step, the user may create the desired one or more share domains and associate the clients with the share domains, and the clients can access the corresponding share domains.

Client IO analysis agent 710 acts as a backend service. In this scenario, client IO analysis agent 710 monitors the IO block sizes of one or more clients in each share domain, determines the IO target block size of each share domain, and updates the result E. Reference may be made to the previous description for the principle of the algorithm thereof, where the target block size represents the block size of most IOs in a share domain.

In this scenario, the client IO analysis agent algorithm may determine the target block size of each share domain based on the IO block sizes on the share domain. Here, according to H1(711) and H5(715), share domain 1 (704) is shared by multiple applications with different block sizes, and the proportions of their block sizes of 32 KB and 64 KB do not meet the standard for being a target block (e.g., the proportion needs to be greater than 90%), so it is not suitable for migration. Therefore, the IO target block size of share domain 1 (704) is determined as the default block size of 8 KB. According to H2 (712) and H3 (713), the predominant block size on share domain 2 (705) is 8 KB, so the IO target block size of share domain 2 (705) is determined to be 8 KB. According to H4 (714), the predominant block size on share domain 3 (706) is 32 KB, so the IO target block size of share domain 3 (706) is determined to be 32 KB. There is no APP running on share domain 4 (707), so the IO target block size of share domain 4 (707) is determined to be the default block size of 8 KB. After determining the target block size of each of the above share domains, the result is updated E=[8,8,32,8].

The action of updating E by client IO analysis agent 710 will trigger the creation checking logic as described in the second phase of FS creation. In this example scenario, file system FS1 (702) with a block size of 8 KB has been created in the first phase, and according to E, new transactional thin-provision file system FS2 (703) with a block size of 32 KB is then created in F, which may have a logical capacity of 1 TB.

A root node of file system FS2 (703) is created for routing the clients to access the share domains.

Figure 7:
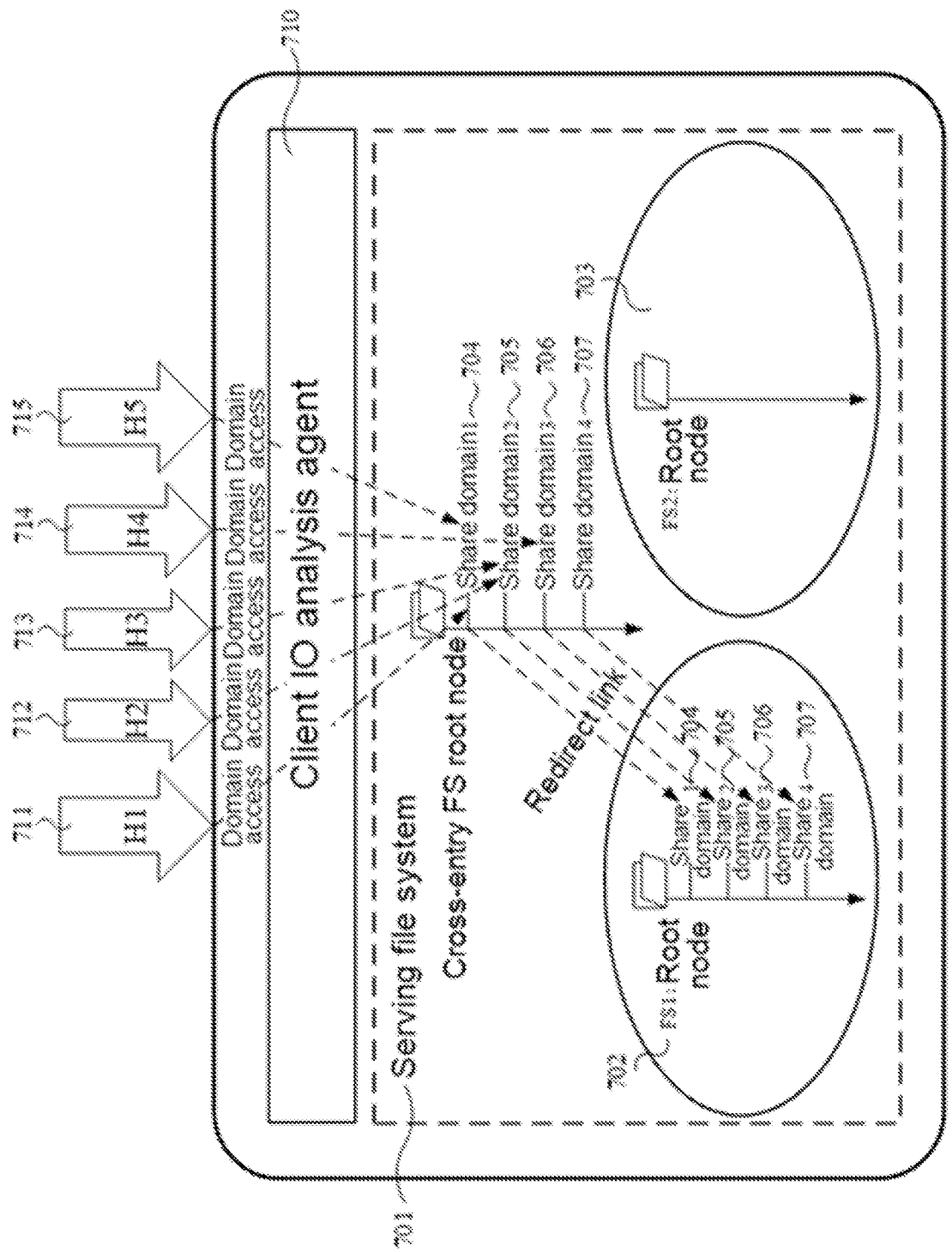
FIG. 7 illustrates a schematic diagram related to an example scenario of adaptive matching that can be used to implement some embodiments according to the present disclosure.

Referring to FIG. 7, H1 (711) correspondingly accesses share domain 1 (704), H2 (712) correspondingly accesses share domain 2 (705), H3 (713) correspondingly accesses share domain 2 (705), H4 (714) correspondingly accesses share domain 3 (706), H5 (715) correspondingly accesses share domain 1 (704), and there is no client accessing share domain 4 (707), share domain 1 (704), share domain 2 (705), share domain 3 (706), and share domain 4 (707) being created on FS1 (702).

After FS2 (703) is created, share domain 3 (706) originally on FS1 (702) will be migrated to FS2 (703) Immediately after the migration is completed, the original redirect link from share domain 3 (706) to FS1 (702) is deleted, the share domain is redirected to FS2 (703), and a redirect link that directionally associates share domain 3 (706) to FS2 (703) is generated.

Figure 8:
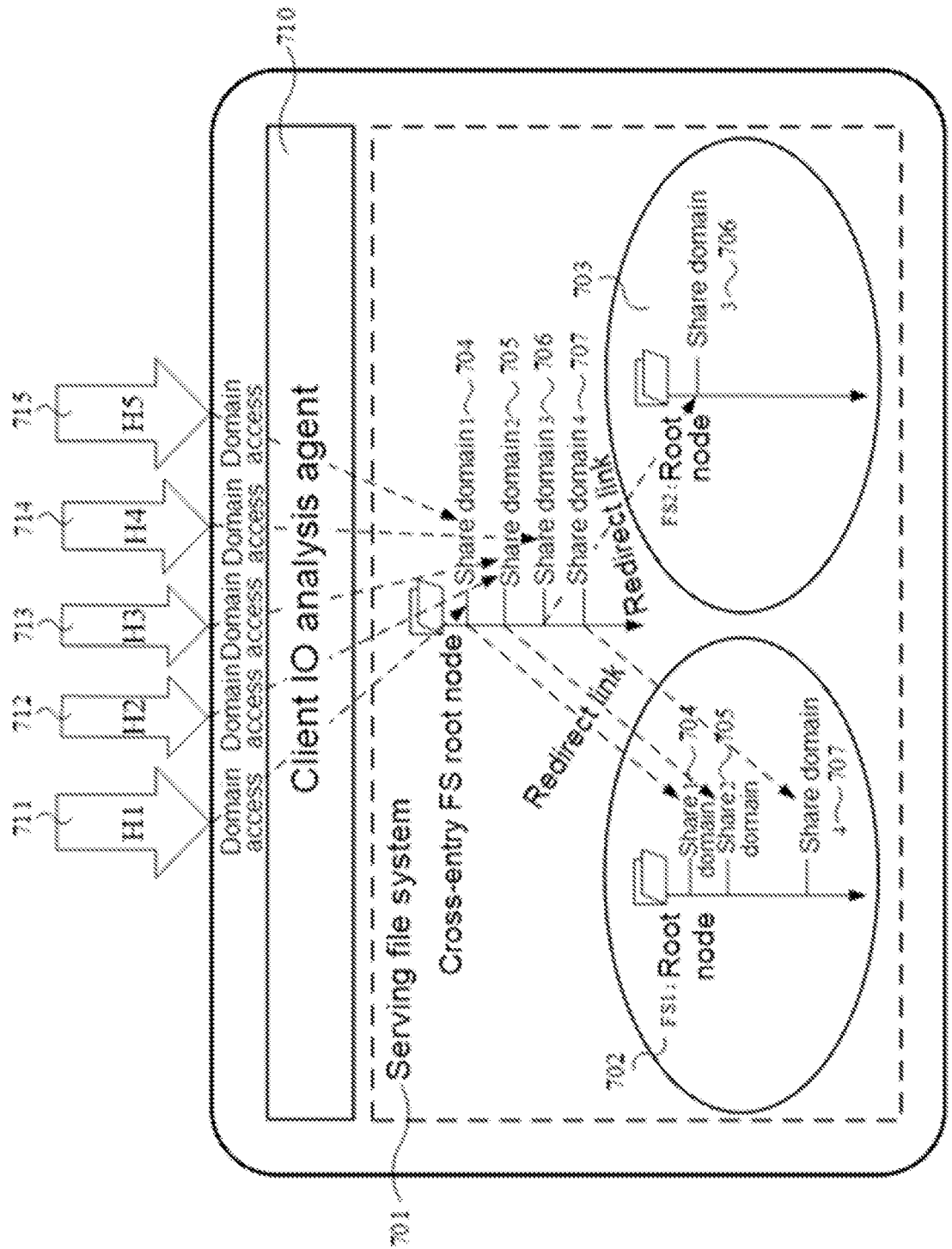
FIG. 8 illustrates a schematic diagram related to an example scenario of adaptive matching that can be used to implement some embodiments according to the present disclosure.

Referring to FIG. 8, share domain 3 (706) that was originally on FS1 (701) is migrated to FS2 (703).

Share domain 5 (708) is newly created for serving client 6 (H6) (716), where H6 (716) runs applications having IOs with a block size of 32 KB. This triggers the monitoring of share domain 5 (708) by client IO analysis agent 710 through these IOs.

Figure 9:
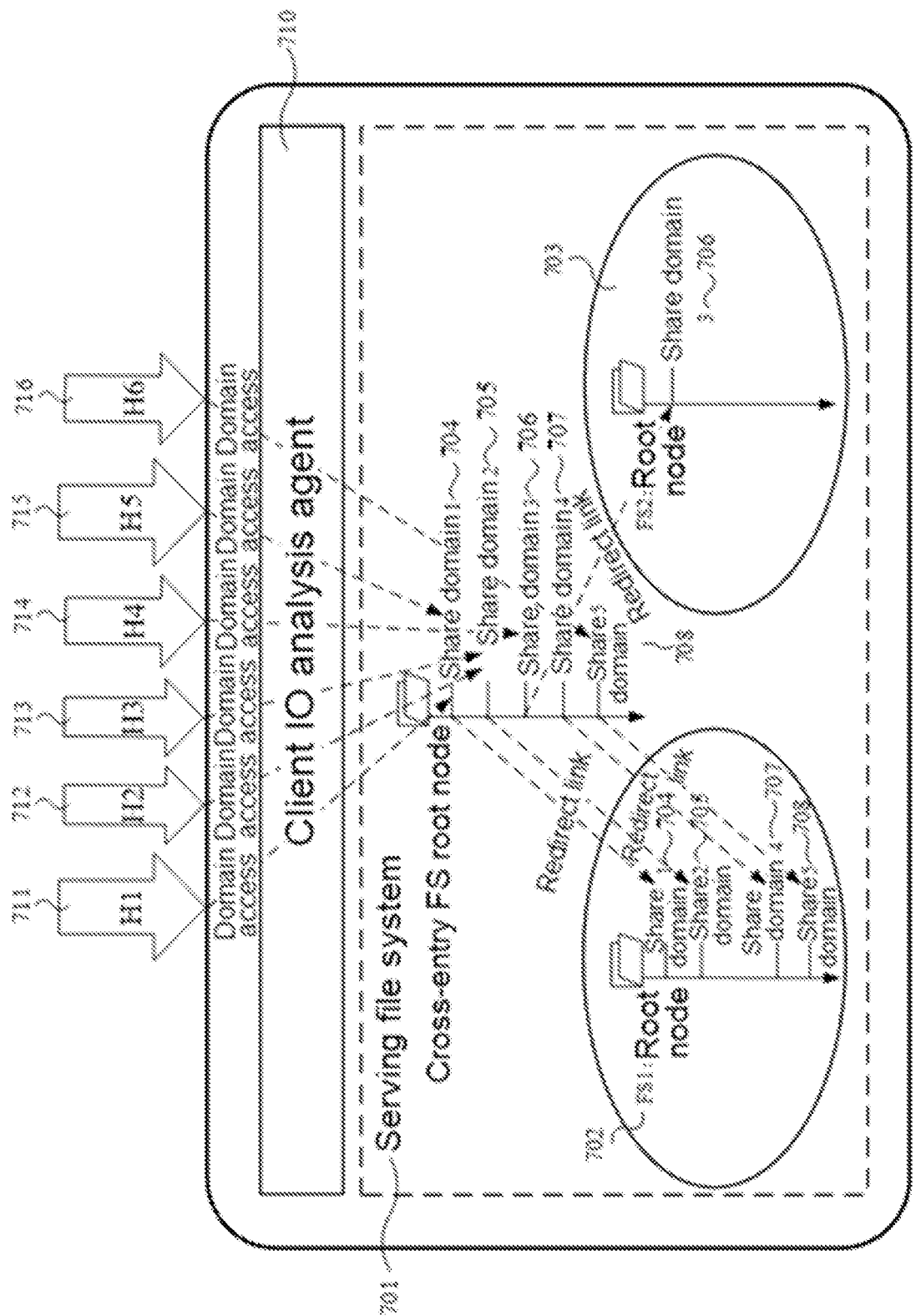
FIG. 9 illustrates a schematic diagram related to an example scenario of adaptive matching that can be used to implement some embodiments according to the present disclosure.

Referring to FIG. 9, H6 (716) correspondingly accesses share domain 5 (708), which is created on FS1 (702) by default while share domain 5 (708) is created.

Client IO analysis agent 710 updates E=[8,8,32,8,32], and the action of updating E will trigger the creation checking logic. It is determined that the target block size of share domain 5 (708) is 32 KB, then it is selected to migrate share domain 5 (708) to FS2 (703) Immediately after the migration is completed, the original redirect link from share domain 5 (708) to FS1 (702) is deleted, the share domain is redirected to FS2 (703), and a redirect link that directionally associates share domain 5 (708) to FS2 (703) is generated.

Figure 10:
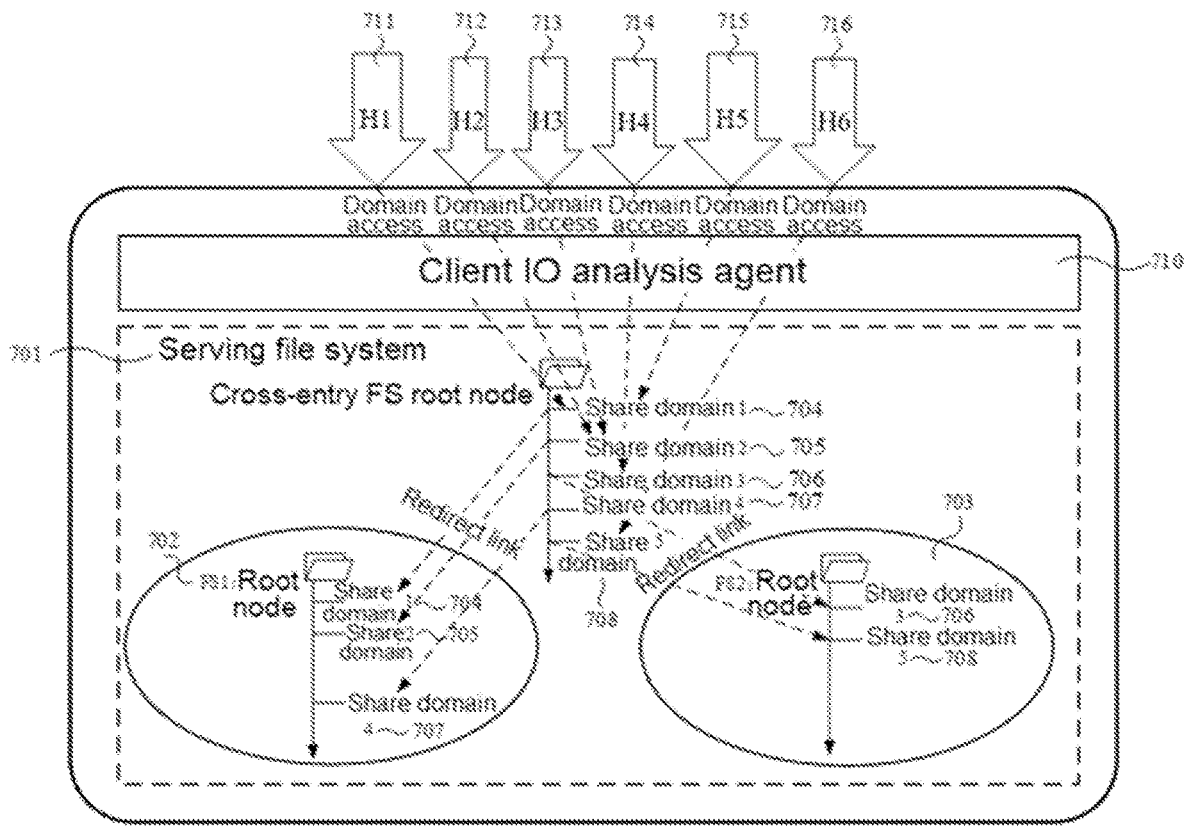
FIG. 10 illustrates a schematic diagram related to an example scenario of adaptive matching that can be used to implement some embodiments according to the present disclosure.

Referring to FIG. 10, share domain 5 (708) with the target block size of 32 KB is migrated to FS2 (703) with a block size of 32 KB, and a redirect link that directionally associates share domain 5 (708) to FS2 (703) is generated.

It should be noted that in some implementations, when a new share domain is created, the new share domain may be created on a default file system, and the system automatically checks to confirm that the new share domain is to be migrated to another file system. In other implementations, when a new share domain is created, the IO block sizes of clients may be manually selected by the user, and the new share domain may be created directly to a file system with an appropriate block size. In an example, when the user creates new share domain 5 (708), the system may provide one or more available options for the IO block sizes of clients. In step 607, if the user selects a block size of 32 KB when creating share domain 5 (708), while FS2 (703) with a block size of 32 KB already exists, then share domain 5 (708) may be created directly on FS2 (703). In this case, there is no need to migrate the share domain since the block size of 32 KB matches the output result of the client IO analysis.

Based on and in combination with the above embodiments, it can be understood that the implementation of the adaptive matching method and the related devices and systems provided by the present application may include the following beneficial effects.

First, the present application provides some analytical ideas for selecting an appropriate FS block size, which helps to reduce storage space fragments and indirect blocks, thereby further improving the performance of a storage system.

Second, one or more file systems in F may be from one storage system or different storage systems in one cluster or even different clusters, and this distributed feature helps to achieve load balancing as one or more IOs are actually distributed across different file systems.

Third, the present application can simplify the setting of file system configuration. Users don't need to consider whether block sizes of transactional file systems match IO block sizes of applications, and the system may automatically match IOs of clients to file systems with appropriate block sizes. Since users do not need to know the IO mode of a specific application when creating a transactional file system, the present application can simplify user operations and improve convenience of use.

Figure 11:
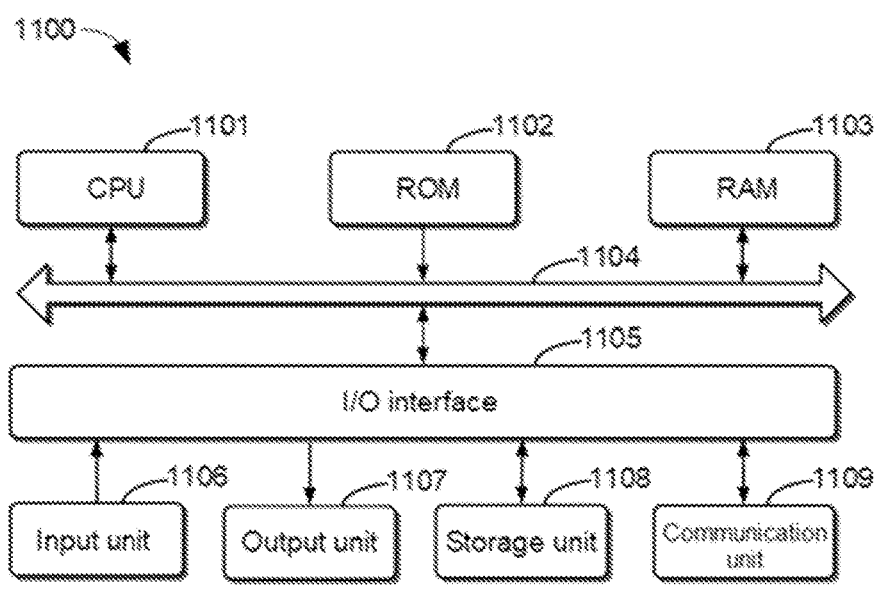
FIG. 11 illustrates a schematic structural diagram of an example device that can be used to implement some embodiments according to the present disclosure.

FIG. 11 illustrates a schematic block diagram of device 1100 that may be used to implement embodiments of the present disclosure. Device 1100 may be a device or apparatus as described in embodiments of the present disclosure, for example, a first device that can implement an adaptive matching method. As shown in the FIG. 11, device 1100 includes central processing unit (CPU) 1101 that may perform various appropriate actions and processing according to computer program instructions stored in read-only memory (ROM) 1102 or computer program instructions loaded from storage unit 1108 to random access memory (RAM) 1103. Various programs and data required for the operation of device 1100 may also be stored in RAM 1103. CPU 1101, ROM 1102, and RAM 1103 are connected to each other through bus 1104. Input/output (I/O) interface 1105 is also connected to bus 1104. Although not shown in FIG. 11, device 1100 may also include a co-processor.

Multiple components in device 1100 are connected to I/O interface 1105, including: input unit 1106, such as a keyboard and a mouse; output unit 1107, such as various types of displays and speakers; storage unit 1108, such as a magnetic disk and an optical disc; and communication unit 1109, such as a network card, a modem, and a wireless communication transceiver. Communication unit 1109 allows device 1100 to exchange information/data with other devices via a computer network, such as the Internet, and/or various telecommunication networks.

The various methods or processes described above may be performed by processing unit 1101. For example, in some embodiments, the method may be implemented as a computer software program that is tangibly included in a machine-readable medium, such as storage unit 1108. In some embodiments, part or all of the computer program may be loaded and/or mounted to device 1100 via ROM 1102 and/or communication unit 1109. When the computer program is loaded into RAM 1103 and executed by CPU 1101, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus, the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

What is claimed is:

1. A method for creating a share domain that mitigates storage inefficiencies, comprising:
    creating, by a system comprising a processor, the share domain, wherein the share domain is created on a first file system, and wherein a block size defining a smallest physical mapping that can be guaranteed in the first file system is a first block size, wherein creating the share domain comprises storing data objects of the share domain in the first file system according the first block size;
    determining a block size defining a smallest physical mapping that can be guaranteed in the share domain as a second block size, wherein the second block size is not equal to the first block size, wherein the determining comprises:
        in response to identifying a total quantity of requests to the share domain satisfying a first defined criterion, and determining that a proportion of the requests having a read/write (IO) block size of read/write (IO) block sizes of the requests satisfies a second defined criterion, setting the second block size to the read/write (IO) block size; and
    migrating, in response to determining that a block size defining a smallest physical mapping that can be guaranteed in a second file system is the second block size, the share domain from the first file system to the second file system, wherein migrating the share domain comprises storing the data objects of the share domain in the second file system according the second block size.

2. The method according to claim 1, wherein the first file system and the second file system are comprised in a file system group.

3. The method according to claim 2, further comprising:
    before the migrating the share domain from the first file system to the second file system, determining that the second file system with a block size of the second block size exists in the file system group.

4. The method according to claim 2, further comprising:
    before the migrating the share domain from the first file system to the second file system, determining that no file system with a block size of the second block size exists in the file system group; and
    creating the second file system in the file system group.

5. The method according to claim 1, wherein the first defined criterion comprises the total quantity of the requests being greater than a first defined threshold, and the second defined criterion comprises the proportion being greater than a second defined threshold.

6. The method according to claim 1, wherein the determining the block size of the share domain as the second block size further comprises:
in response to identifying the total quantity of requests to the shared domain satisfying the first defined criterion, and determining that no proportion of the requests satisfies the second defined criterion, setting the second block side to a default block size.

7. The method according to claim 1, wherein the determining the block size of the share domain as the second block size further comprises:
in response to determining that the share domain has not been accessed by any client within a defined period of time, setting the second block size to a default block size.

8. The method according to claim 1, further comprising:
creating a first redirect link between the share domain and the first file system.

9. The method according to claim 8, further comprising:
deleting the first redirect link after migrating the share domain from the first file system to the second file system.

10. The method according to claim 8, further comprising:
generating a second redirect link between the share domain and the second file system after migrating the share domain from the first file system to the second file system.

11. A device, comprising:
a processor; and
a memory coupled to the processor, wherein the memory has instructions stored therein, and the instructions, when executed by the processor, cause the device to execute operations, comprising:
creating a share domain, wherein the share domain is created on a first file system, and wherein a block size defining a smallest physical mapping that can be guaranteed in the first file system is a first block size, wherein creating the share domain comprises storing data objects of the share domain in the first file system according the first block size;
determining a block size defining a smallest physical mapping that can be guaranteed in the share domain as a second block size, wherein the second block size is not equal to the first block size, wherein the determining comprises:
in response to identifying a total quantity of requests to the share domain satisfying a first defined criterion, and determining that a proportion of the requests having a read/write (IO) block size of read/write (IO) block sizes of the requests satisfies a second defined criterion, setting the second block size to the read/write (IO) block size; and
migrating, if a block size defining a smallest physical mapping that can be guaranteed in a second file system is the second block size, the share domain from the first file system to the second file system, wherein migrating the share domain comprises storing the data objects of the share domain in the second file system according the second block size.

12. The device according to claim 11, wherein the first file system and the second file system are comprised in a file system group.

13. The device according to claim 12, wherein the operations further comprise:
before the migrating the share domain from the first file system to the second file system, determining that the second file system with a block size of the second block size exists in the file system group.

14. The device according to claim 12, wherein the operations further comprise:
before the migrating the share domain from the first file system to the second file system, determining that no file system with a block size of the second block size exists in the file system group; and
creating the second file system in the file system group.

15. The device according to claim 11, wherein the first defined criterion comprises the total quantity of the requests being greater than a first defined threshold, and the second defined criterion comprises the proportion being greater than a second defined threshold.

16. The device according to claim 11, wherein the determining the block size of the share domain as the second block size further comprises:
in response to identifying the total quantity of requests to the shared domain satisfying the first defined criterion, and determining that no proportion of the requests satisfies the second defined criterion, setting the second block side to a default block size.

17. The device according to claim 11, wherein the determining the block size of the share domain as the second block size comprises:
in response to determining that the share domain has not been accessed by any client within a defined period of time, setting the second block size to a default block size.

18. The device according to claim 11, wherein the operations further comprise:
creating a first redirect link between the share domain and the first file system.

19. The device according to claim 18, wherein the operations further comprise at least one of:
deleting the first redirect link after migrating the share domain from the first file system to the second file system, or
generating a second redirect link between the share domain and the second file system after migrating the share domain from the first file system to the second file system.

20. A computer program product stored on a non-transitory computer-readable medium and comprising machine-executable instructions, wherein the machine-executable instructions, when executed, cause a machine to execute operations, comprising:
creating a share domain, wherein the share domain is created on a first file system, and wherein a block size defining a smallest physical mapping that can be guaranteed in the first file system is a first block size, wherein creating the share domain comprises storing data objects of the share domain in the first file system according the first block size;
determining a block size defining a smallest physical mapping that can be guaranteed in the share domain as a second block size, wherein the second block size is not equal to the first block size, wherein the determining comprises:
in response to identifying a total quantity of requests to the share domain satisfying a first defined criterion, and determining that a proportion of the requests having a read/write (IO) block size of read/write (IO) block sizes of the requests satisfies a second defined criterion, setting the second block size to the read/write (IO) block size; and migrating, if a block size defining a smallest physical mapping that can be guaranteed in a second file system is the second block size, the share domain from the first file system to the second file system, wherein migrating the share domain comprises storing the data objects of the share domain in the second file system according the second block size.

* * * * *